US010367832B2

(12) United States Patent
Deardorff et al.

(10) Patent No.: US 10,367,832 B2
(45) Date of Patent: Jul. 30, 2019

(54) REACTIVE VIRTUAL SECURITY APPLIANCES

(71) Applicant: Rapid7, Inc., Boston, MA (US)

(72) Inventors: Paul Deardorff, Westlake Village, CA (US); Derek Abdine, Lomita, CA (US); Andreas Galauner, Aachen (DE); Mark Momburg, Ubach-Palenberg (DE)

(73) Assignee: Rapid7, Inc., Boston, MA (US)

( * ) Notice: Subject to any disclaimer, the term of this patent is extended or adjusted under 35 U.S.C. 154(b) by 184 days.

(21) Appl. No.: 15/418,663

(22) Filed: Jan. 27, 2017

(65) Prior Publication Data
US 2018/0219880 A1    Aug. 2, 2018

(51) Int. Cl.
*H04L 29/06* (2006.01)

(52) U.S. Cl.
CPC ...... *H04L 63/1416* (2013.01); *H04L 63/1425* (2013.01); *H04L 63/1433* (2013.01); *H04L 63/1491* (2013.01)

(58) Field of Classification Search
CPC ..... H04L 63/00; H04L 63/14; H04L 63/1408; H04L 63/1416; H04L 63/1433; H04L 63/1441; H04L 63/1491; H04L 2463/144
See application file for complete search history.

(56) References Cited

U.S. PATENT DOCUMENTS

| | | | | |
|---|---|---|---|---|
| 7,779,465 B2 * | 8/2010 | Baker | ............... | G06F 21/554 726/22 |
| 8,483,652 B2 * | 7/2013 | Hall | ............... | A63F 13/10 455/404.1 |
| 9,495,188 B1 * | 11/2016 | Ettema | ............... | G06F 9/45533 |
| 9,628,502 B2 * | 4/2017 | Clark | ............... | H04L 63/1433 |
| 9,674,201 B1 * | 6/2017 | Margel | ............... | H04L 63/102 |
| 9,860,208 B1 * | 1/2018 | Ettema | ............... | G06F 21/602 |
| 9,882,929 B1 * | 1/2018 | Ettema | ............... | H04L 63/145 |
| 2003/0212898 A1 * | 11/2003 | Steele | ............... | H04L 63/0209 726/15 |
| 2006/0101516 A1 * | 5/2006 | Sudaharan | ............... | H04L 63/0263 726/23 |
| 2006/0174001 A1 * | 8/2006 | Zhu | ............... | H04L 63/1416 709/225 |
| 2008/0103799 A1 * | 5/2008 | Domenikos | ............... | G06Q 30/0185 705/318 |
| 2012/0167208 A1 * | 6/2012 | Buford | ............... | H04L 63/1491 726/22 |
| 2013/0305369 A1 * | 11/2013 | Karta | ............... | H04L 63/1416 726/23 |
| 2014/0082730 A1 * | 3/2014 | Vashist | ............... | H04L 63/1416 726/23 |

(Continued)

FOREIGN PATENT DOCUMENTS

EP    3057283 A1 *  8/2016  ............. G06F 21/53
WO   WO-2010030169 A2 *  3/2010  ......... H04L 63/1441

*Primary Examiner* — Eric W Shepperd
(74) *Attorney, Agent, or Firm* — Danielson Legal LLC

(57) ABSTRACT

Methods and systems for monitoring network activity. Various embodiments may deploy virtual security appliances to a certain location or with a specific configuration based on data regarding previous attacks and attacker activity. Accordingly, the deployed virtual security appliance(s) are better suited to gather more useful behavior regarding threat actor behavior and attacks.

13 Claims, 5 Drawing Sheets

(56) References Cited

U.S. PATENT DOCUMENTS

| | | | |
|---|---|---|---|
| 2014/0096229 A1* | 4/2014 | Burns | H04L 63/1491 |
| | | | 726/15 |
| 2014/0191862 A1* | 7/2014 | Haines | G08B 13/2494 |
| | | | 340/539.11 |
| 2014/0197952 A1* | 7/2014 | Parker | G08B 21/22 |
| | | | 340/568.1 |
| 2015/0121529 A1* | 4/2015 | Quinlan | H04L 63/1491 |
| | | | 726/23 |
| 2016/0149950 A1* | 5/2016 | Ashley | G06F 9/45533 |
| | | | 726/23 |
| 2016/0260314 A1* | 9/2016 | Gu | G08B 13/19656 |
| 2017/0048274 A1* | 2/2017 | Quinlan | H04L 63/1491 |
| 2017/0318053 A1* | 11/2017 | Singh | H04L 63/1491 |

* cited by examiner

REACTIVE VIRTUAL SECURITY APPLIANCES

TECHNICAL FIELD

This invention generally relates to systems and methods for monitoring network activity, and in particular to systems and methods for monitoring network activity to gather data regarding attacker behavior and network attacks.

BACKGROUND

Due to its prevalence in today's society and popularity for connecting financial resources and data sources, the internet and connected networks have become a hub for criminal activity. To detect, monitor, and learn about criminal behavior, security personnel often implement one or more honeypot devices within a network. Honeypot devices are security mechanisms that can appear to be attractive targets to an outside observer (e.g., a threat actor), but nonetheless monitor the threat actor's behavior and may assist in defending the network from the threat actor.

Existing honeypot devices generally collect, log, and transmit data for further analysis by a security researcher. These honeypot devices can vary in their complexity and functionality. For example, honeypot devices may be low interaction data collectors that only emulate services, or high interaction honeypot devices that capture attacker interactions through accessible operating systems and applications.

Oftentimes, however, honeypot devices are deployed statically to a single location. This makes them identifiable over time. Once a threat actor identifies a device as a honeypot device, they may take steps to avoid the device in future activity, thereby rendering the honeypot device ineffective.

While these static honeypots are likely to collect internet traffic and scan noise, they are unlikely to elicit interesting and useful data regarding targeted attacks. Furthermore, the lack of reactive honeypot actions based on prior attack(s) and internet scan data limits the usefulness of the data collected.

A need exists, therefore, for methods and systems that overcome the above disadvantages of existing honeypot devices.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for monitoring network activity. The method includes deploying at least a first virtual security appliance in a network; receiving data regarding an attack on at least the first virtual security appliance; and deploying at least one subsequent virtual security appliance to a network location in response to the attack.

In one embodiment, the at least one subsequent virtual security appliance is deployed to a network location calculated to receive an attack based on at least the attack on the first virtual security appliance.

In one embodiment, the method further includes tailoring at least one feature of the at least one subsequent virtual security appliance in response to the attack on at least the first virtual security appliance. In one embodiment, tailoring the at least one feature is based on at least one of targeted ports, services, user agent strings, specific vulnerabilities of the first virtual security appliance, specific versions of services known to be vulnerable on the first virtual security appliance, and geography of the attack on the first virtual security appliance. In one embodiment, tailoring the at least one feature includes simulating at least one service via the at least one subsequent virtual security appliance.

In one embodiment, the method further includes receiving data regarding an attack on the at least one subsequent virtual security appliance; and deploying an additional virtual security appliance to a network location in response to the attack on the at least one subsequent virtual security appliance.

According to another aspect, embodiments relate to a system for monitoring network activity. The system includes a processing device; and memory, wherein the processing device is configured to execute instructions stored on the memory to deploy a first virtual security appliance in a network; receive data regarding an attack on at least the first virtual security appliance; and deploy at least one subsequent virtual security appliance to a network location in response to the attack on at least the first virtual security appliance.

In one embodiment, the at least one subsequent virtual security appliance is deployed to a network location calculated to receive an attack based on the attack on at least the first virtual security appliance.

In one embodiment, the processing device is configured to receive data regarding at least one previous attack on at least one other virtual security appliance, and further configured to deploy the at least one subsequent virtual security appliance based on the data regarding the at least one previous attack on the at least one other virtual security appliance.

In one embodiment, the processing device is further configured to tailor at least one feature of the at least one subsequent virtual security appliance in response to the attack on at least the first virtual security appliance.

In one embodiment, tailoring the at least one feature is based on at least one of targeted ports, services, user agent strings, specific vulnerabilities of the first virtual security appliance, specific versions of services known to be vulnerable on the first virtual security appliance, and geography of the attack on the first virtual security appliance. In one embodiment, tailoring the at least one feature includes simulating at least one service via the at least one subsequent virtual security appliance. In one embodiment, the processing device is further configured to receive data regarding an attack on the at least one subsequent virtual security appliance; and deploy an additional virtual security appliance to a network location in response to the attack on the at least one subsequent virtual security appliance.

According to yet another aspect, embodiments relate to a method for monitoring network activity. The method includes deploying a first virtual security appliance in a network; receiving data regarding an attack on the first virtual security appliance; and tailoring at least one feature of the first virtual security appliance based on the data regarding the attack on the first virtual security appliance.

In one embodiment, tailoring the at least one feature includes deploying the virtual security appliance to a network location calculated to receive an attack.

In one embodiment, tailoring the at least one feature is based on at least one of targeted ports, services, user agent strings, specific vulnerabilities of the first virtual security appliance, specific versions of services known to be vulnerable on the first virtual security appliance, and geography of the attack on the first virtual security appliance.

In one embodiment, tailoring the at least one feature includes simulating at least one service via the first virtual security appliance.

In one embodiment, the method further includes receiving data regarding a second attack on the tailored virtual security appliance; and tailoring at least one feature of the virtual security appliance in response to the second attack.

In one embodiment, the method further includes deploying at least one subsequent virtual security appliance to a network location calculated to receive an attack.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
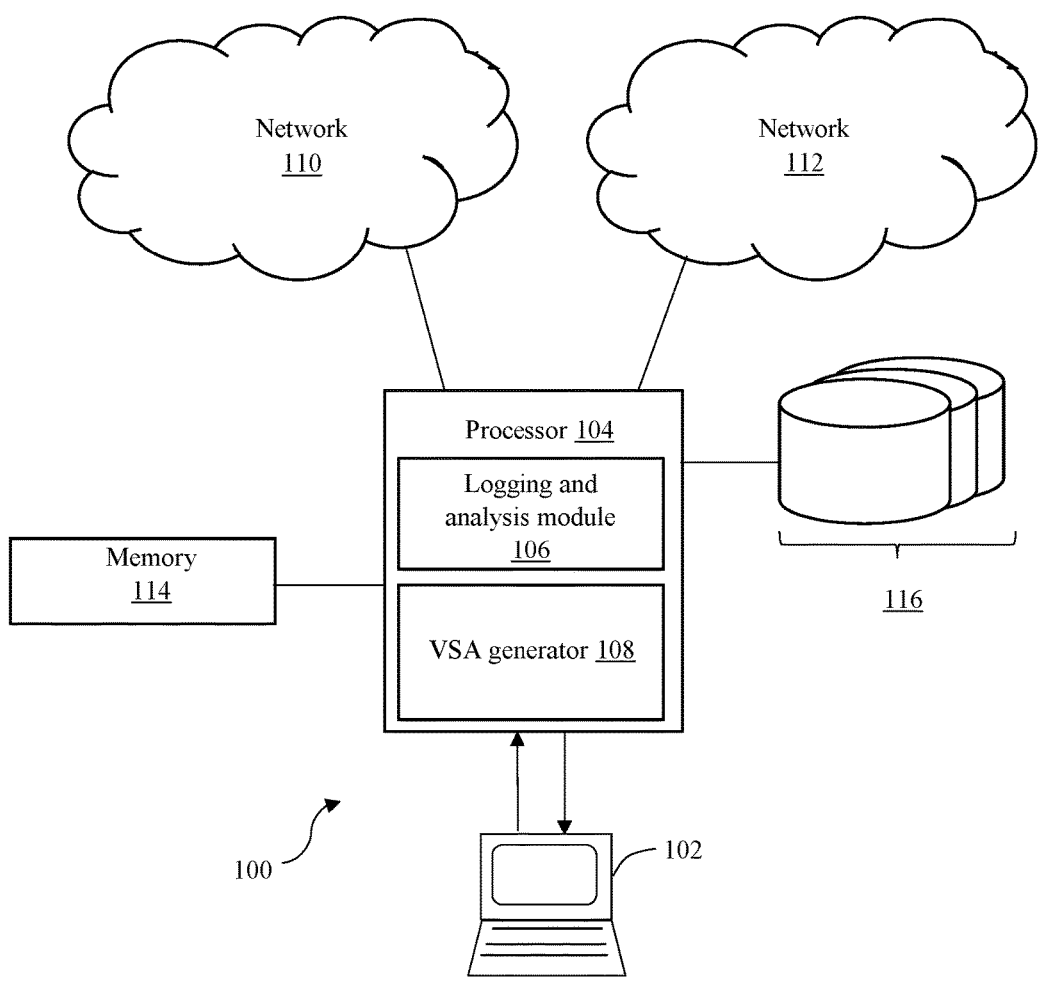
FIG. 1 depicts a system for monitoring network activity in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc-read-only memories (CD-ROMs), magnetic-optical disks, read-only memories (ROMs), random access memories (RAMs), erasable programmable read-only memory (EPROMs), electrically erasable programmable read-only memory (EEPROMs), magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As mentioned previously, existing techniques for monitoring networks involve deploying a honeypot device to a single, static location. While these honeypot devices can vary in their design and complexity, they generally only gather mass scan data and that may be limited in its usefulness.

Accordingly, features of various embodiments described herein deploy one or more virtual security appliances (e.g., honeypot devices) to a certain location and/or with a specific configuration based on data regarding previous attacks and threat actor behavior. Accordingly, the deployed virtual security appliance(s) are better configured and/or better positioned to gather more useful data regarding threat actor behavior and attacks.

FIG. 1 illustrates a system 100 for monitoring network activity in accordance with one embodiment. The system 100 may include an interface 102 accessible by a user such as security personnel or the like and a processor 104 that includes a logging and analysis module 106 and a virtual security appliance (VSA) generator 108. The system 100 may include or otherwise be implemented in connection with one or more networks 110 and 112. The system 100 may further include memory 114 and a plurality of databases 116.

The interface 102 may be any type of interface accessible by a user such as security personnel (hereinafter "user"). The interface 102 may enable the user to configure virtual security appliances and gather feedback regarding one or more deployed virtual security appliances. The interface 102 may be configured as, for example, a personal computer (PC), laptop, tablet, mobile device, or the like.

The processor 104 (processing device) may be any hardware device capable of executing the logging and analysis module 106 and the VSA generator 108 to gather and analyze data regarding attacker behavior and to deploy one or more virtual security appliances. The processor 104 may be a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 104 may be configured as part of the user interface 102 (e.g., a laptop) or may be located at some remote location. That is, the processing of data regarding attacker behavior may be done on a server at a remote location.

The logging and analysis module 106 may analyze data regarding different types of attacks on existing virtual security appliances as well as threat actor behavior. This data may be gathered from one or more of the databases 116. The analysis module 106 may query the databases for any type of data relevant to the generation and deployment of one or more virtual security appliances. Accordingly, the logging and analysis module 106 may collect and broker data between the core components of the system 100.

The logging and analysis module 106 may analyze data regarding, for example, attack patterns, targeted ports, geographies/locations of known attacks, user agent strings, services known to be vulnerable, versions of services known to be vulnerable, services under attack, attack vectors, or the like. This list is non-exhaustive and other types of data and information may similarly be considered. This data may be processed into actionable data for the VSA generator 108.

For example, the logging and analysis module 106 may output a list highlighting the most common locations for attacks. As another example, the logging and analysis module 106 may output a list of the most common sectors and industries under attack. The logging and analysis module 106 may compute various derivatives of the measured parameters or data collected. These derivatives may include, but are not limited to, simple averages (i.e., mean(s)), weighted averages, standard deviations, etc.

The VSA generator 108 may consider the data outputted by the logging and analysis module 106 to generate, tailor, or otherwise configure one or more virtual security appliances. In some embodiments, the VSA generator 108 may generate and deploy a new virtual security appliance with a certain configuration and/or to a certain location. In some embodiments, the VSA generator 108 may also tailor one or more deployed virtual security appliances based on the data from the logging and analysis module 106 and/or the one or more of the plurality of databases 116.

Therefore, one or more virtual security appliances can be specifically configured to receive attack(s) to gather more useful data regarding said attack(s). Accordingly, this addresses the previously discussed concern of collecting mass scan data that is limited in its usefulness.

The networks 110 and/or 112 may link the various devices with various types of network connections. The networks 110 and/or 112 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The networks 110 and/or 112 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The memory 114 may be L1, L2, L3 cache or RAM memory configurations. The memory 114 may include non-volatile memory such as flash memory, EPROM, EEPROM, ROM, and programmable read-only memory (PROM), or volatile memory such as static or dynamic RAM, as discussed above. The exact configuration/type of memory 114 may of course vary as long as instructions for analyzing attack data and generating virtual security appliances can be executed by the processor 104.

The databases 116 may store a variety of types of data related to attacks and threat actor behavior. These may include data regarding previous attacks on one or more virtual security appliances as well as data from public and/or private resources. Data collected from the virtual security appliances may be uploaded to one or more storage services at predetermined time intervals (e.g., once every hour). This data may be sent through a processing pipeline to add additional metadata to the incident logs. Data may also streamed into logs that provide additional storage and search capabilities for the incident data.

Figure 2:
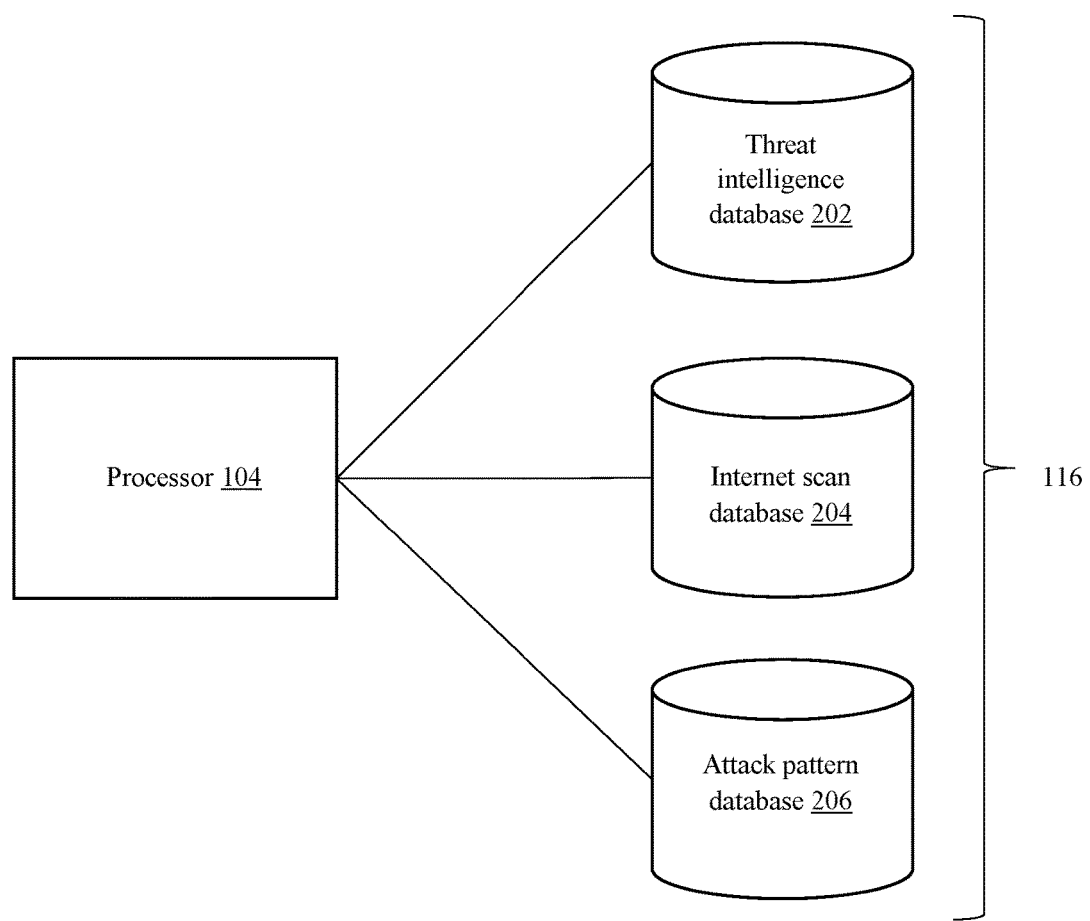
FIG. 2 illustrates the processor of FIG. 1 in communication with a plurality of databases in accordance with one embodiment.

FIG. 2 illustrates several exemplary databases 116 that may store data related to threat actor behavior and attacks. These databases 116 may include a threat intelligence database 202, an internet scan database 204, and an attack pattern database 206.

Figure 3:
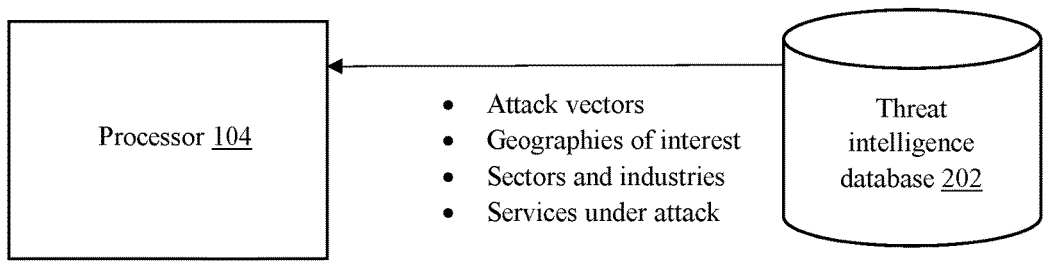
FIG. 3 illustrates the processor of FIG. 1 receiving data from the threat intelligence database of FIG. 2 in accordance with one embodiment.

FIG. 3 illustrates the threat intelligence database 202 in communication with the processor 104 of FIG. 1. The threat intelligence database 202 may store data regarding internet protocol (IP) addresses, networks, services, known attackers, researchers, etc. This stored data can be searched by one or more parameters, thereby providing a security researcher the data and context they need to make inferences and to develop intelligence about network landscapes and attacks. As illustrated, the threat intelligence database 202 may store and communicate data regarding at least one of attack vectors, geographies of interest, sectors and industries under attack, and services under attack.

Figure 4:
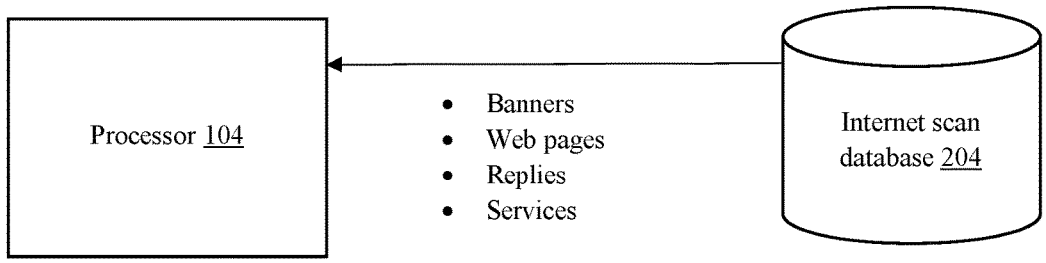
FIG. 4 illustrates the processor of FIG. 1 receiving data from the internet scan database of FIG. 2 in accordance with one embodiment.

FIG. 4 illustrates the internet scan database 204 in communication with the processor 104 of FIG. 1. The internet scan database 204 may store and communicate data that relates to publicly-accessible services on the Internet. Various projects have been capturing terabytes of internet scan data for several years from various services and protocols. These include, but are not limited to, protocols and technologies such as forward domain name system (DNS), reverse DNS, HyperText Transfer Protocol (HTTP), transport layer security (TLS), secure sockets layer (SSL), User Datagram Protocol (UDP), Simple Mail Transfer Protocol (SMTP), Post Office Protocol (POP), Voice over Internet Protocol (VOIP), and File Transfer Protocol (FTP).

As seen in FIG. 4, the internet scan database 204 may communicate data regarding banners, web pages, replies, and services to the processor 104. This data may be used to make a new or existing virtual security appliance from known services or a reasonable facsimile thereof (e.g., bind shell services and/or reverse shell services). This may camouflage the virtual security appliances and make it harder for threat actors to recognize the virtual security appliances as honeypot devices.

Figure 5:
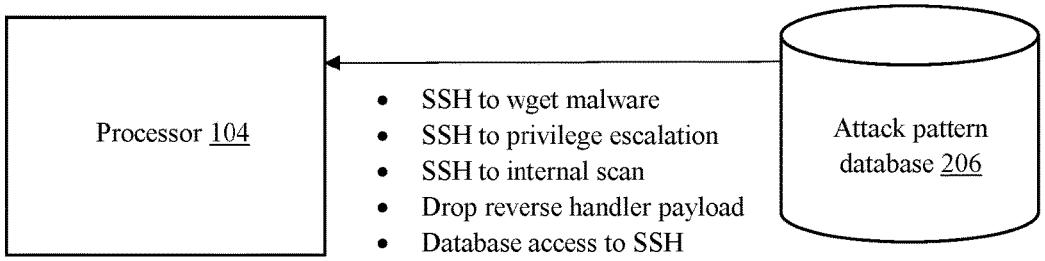
FIG. 5 illustrates the processor of FIG. 1 receiving data from the attack pattern database of FIG. 2 in accordance with one embodiment.

FIG. 5 illustrates the attack pattern database 206 in communication with the processor 104 of FIG. 1. The attack pattern database 206 may store data accumulated from various penetration testing teams and/or other security sources. The attack pattern database 206 may be continuously updated with data regarding new attacks and new attack patterns. Accordingly, the attack pattern database 206 may be in communication with a plurality of other data sources or parties (not shown) that provide this data. Accordingly, the process of automated detection and manual oversight by a security researcher ensures a high level of data quality that is stored in the attack pattern database 206. As seen in FIG. 5, the attack pattern database may store and communicate data related to, for example, various secure shell (SSH) protocols.

Figure 6A:
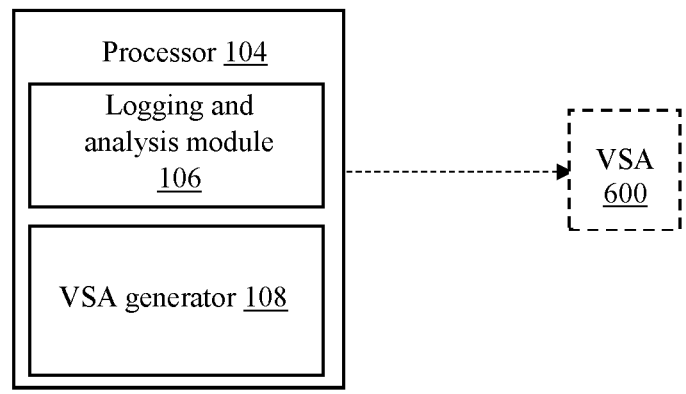
FIGS. 6A-C illustrate a method for monitoring network activity in accordance with one embodiment.
Figure 6B:
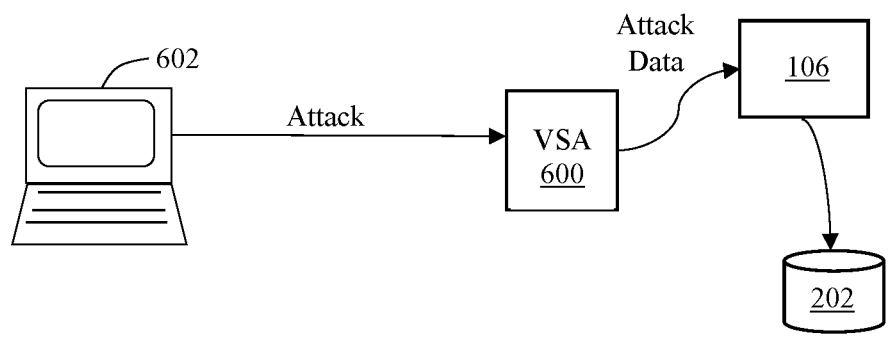
Figure 6C:
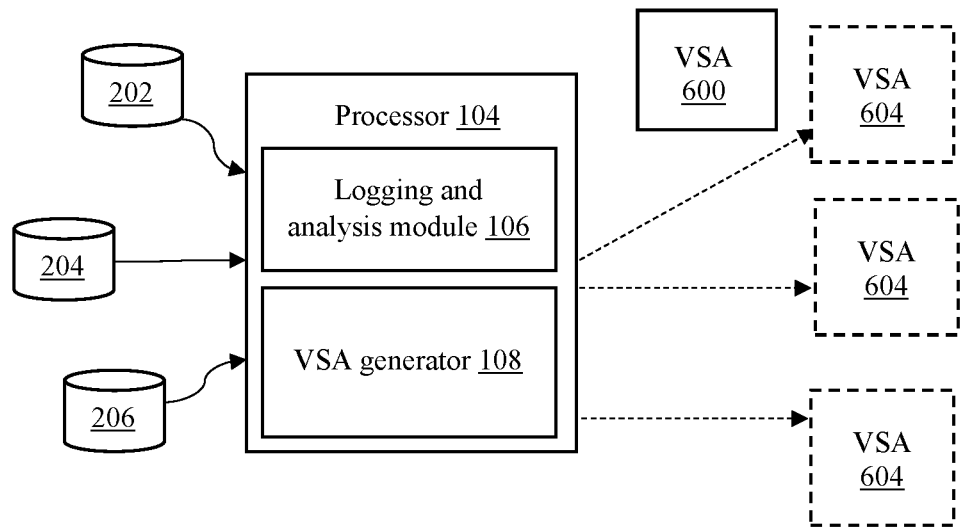

FIGS. 6A-C illustrate a method for monitoring network activity in accordance with one embodiment. FIG. 6A illustrates the processor of 104 of FIG. 1 deploying a virtual security appliance 600 to a network location (e.g., as determined by its IP address). Specifically, the VSA generator 108 of the processor 104 may deploy the virtual security appliance 600. A user may also input configuration instructions or modifications via the interface 102 of FIG. 1.

FIG. 6B illustrates an attacker 602 initiating an attack on the virtual security appliance 600. The logging and analysis module 106 may gather data regarding the attack and communicate said data to the threat intelligence database 202. This data may include, for example, targeted ports, targeted services, user agent strings, specific geographies, or any other type of metadata collected.

For example, if a connection is made on port 62078 and commands are sent over Transmission Control Protocol (TCP), the logging and analysis module 106 may determine that the attack is targeting an iOS system and, more specifically, the usbmuxd protocol. Again, this determination may be based on what port was targeted, expected command structures in accord with the protocol, and how the attacker's commands are formatted.

Data from the threat intelligence database 202, the internet scan database 204, and the attack pattern database 206 may be communicated to the VSA generator 108. FIG. 6C illustrates this data being communicated to the processor (i.e., the VSA generator 108). The VSA generator 108 may then generate and deploy one or more subsequent virtual security appliances 604. The new, subsequent VSA(s) 604 are more tailored to receive future attacks and learn more about the attacks. The subsequent VSA(s) 604 may or may not be in the same network as the original virtual security appliance 600.

This process may be iterated as necessary as many times as desired. For example, data regarding attacks on the subsequent virtual security appliance(s) 604 may be analyzed, and then used to generate and deploy even more virtual security appliances.

The deployment of the subsequent VSAs 604 may be based on specific cloud infrastructures such as AMAZON WEB SERVICE® (AWS), Azure, Google Cloud, Digital Ocean, etc., as well as geography of earlier attacks. For instance, a globally deployed VSA infrastructure may monitor where attacks are occurring and/or what the attacks are targeting. The system may then deploy more tailored virtual security appliances in geographies that are more heavily targeted than others.

The subsequent VSAs 604 may also be configured so as to elicit further attacks. For example, a VSA 600 suffering an attack targeting iOS services may result in the generation of a subsequent VSA 604 specifically offering one or more iOS services in addition to or in lieu of the services typically offered by computers running other operating systems. These services may be legitimate services or spoofed services appearing to an attacker to be legitimate. These services may also include known vulnerabilities or spoofed vulnerabilities appearing to an attacked to be legitimate. Subsequent VSAs 604 may similarly be configured to leave one or more ports open, to have compromised or compromisable login credentials, etc.

For example, if virtual security appliances in Singapore begin receiving probes for services related to online banking, the processor 104 may deploy more VSAs configured to appear as computers offering banking-related services in Singapore. Deployed virtual security appliances in private networks may also provide data regarding attacks that target environments that are not based on cloud infrastructure. For example, the system 100 may alert banking customers in regions where a virtual security appliance has been attacked and deploy banking-related virtual security appliances in customers' private networks or cloud infrastructure.

Figure 7A:
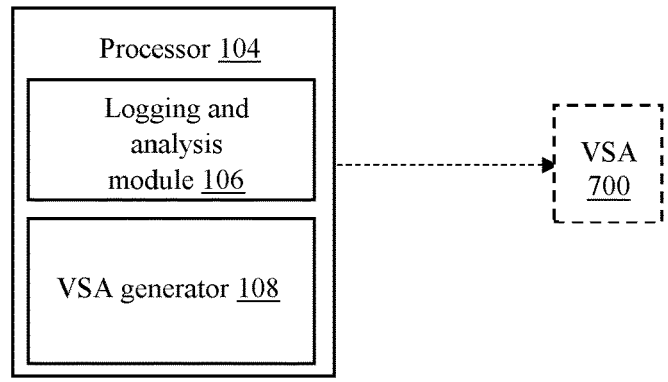
FIGS. 7A-C illustrate a method for monitoring network activity in accordance with another embodiment.
Figure 7B:
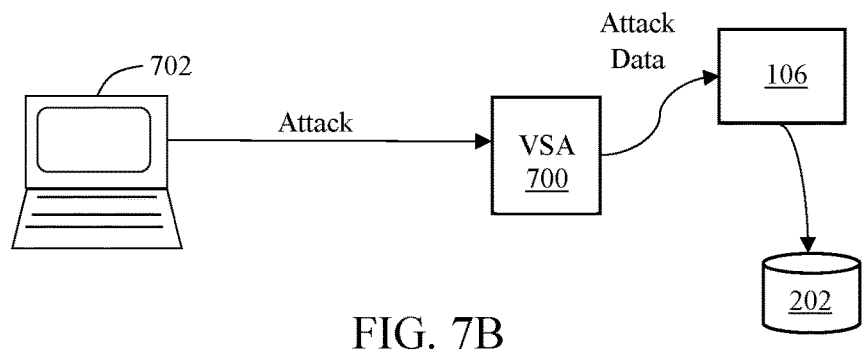
Figure 7C:
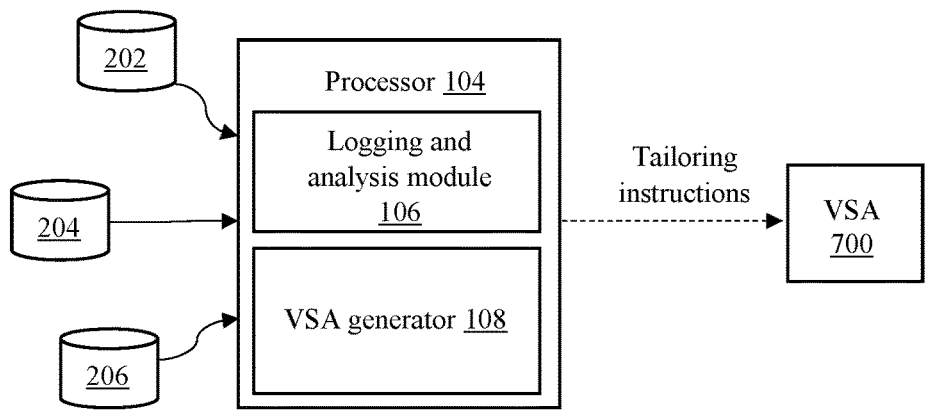

FIGS. 7A-C illustrate a method for monitoring a network in accordance with another embodiment. FIG. 7A illustrates the processor 104 (i.e., the VSA generator 108) generating and deploying a virtual security appliance 700 to a network location. A user may also input configuration instructions via the interface 102 of FIG. 1 as to the location of where the virtual security appliance 700 is to be deployed as well as other settings.

FIG. 7B illustrates an attacker 702 initiating an attack on the virtual security appliance 700. The logging and analysis module 106 may gather data regarding the attack and communicate said data to the threat intelligence database 202. This data may include, for example, targeted ports, targeted services, user agent strings, specific geographies, or any other type of metadata collected.

FIG. 7C illustrates data from the threat intelligence database 202, the internet scan database 204, and the attack pattern database 206 being communicated to the processor (i.e., the VSA generator 108). In addition to or instead of deploying a new VSA (as in FIG. 6C), FIG. 7C illustrates the VSA generator 108 tailoring at least one feature of the existing VSA 700 via tailoring instructions.

For example, the VSA generator 108 may change the location of the virtual security appliance 700, open certain ports on the virtual security appliance 700, close certain ports on the virtual security appliance 700, simulate certain bind-shell services, simulate certain reverse-shell services, etc. Therefore, the virtual security appliance 700 becomes more tailored and better able to gather more relevant data regarding threat actors and their attacks.

This process may be iterated as necessary as many times as desired. For example, data regarding attacks on the tailored virtual security appliance(s) 700 may be analyzed, and then used to tailor the already-deployed virtual security appliance(s) 700 again.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for monitoring network activity, the method comprising:
   deploying at least a first virtual security appliance simulating a service to a location on a network corresponding to a physical location;
   receiving data regarding an attack on the first virtual security appliance, wherein the attack targets the simulated service;
   deploying at least one subsequent virtual security appliance simulating the targeted service to the location on the network corresponding to the physical location in response to the attack; and
   alerting a user of the targeted service in the physical location about the attack on the first virtual security appliance targeting the service, wherein the user is alerted about the attack based on the user being in the physical location of the attack and based on the user using the targeted service.

2. The method of claim 1, further comprising tailoring at least one feature of the at least one subsequent virtual security appliance in response to the attack on the first virtual security appliance.

3. The method of claim 2, wherein tailoring the at least one feature is based on at least one of targeted ports, targeted services, user agent strings, specific vulnerabilities of the first virtual security appliance, and specific versions of services known to be vulnerable on the first virtual security appliance.

4. The method of claim 1, further comprising:
receiving data regarding an attack on the at least one subsequent virtual security appliance; and
deploying an additional virtual security appliance to the location on the network corresponding to the physical location in response to the attack on the at least one subsequent virtual security appliance.

5. A system for monitoring network activity, the system comprising:
a processing device; and
memory, wherein the processing device is configured to execute instructions stored on the memory to:
deploy a first virtual security appliance simulating a service to a location on a network corresponding to a physical location;
receive data regarding an attack on the first virtual security appliance, wherein the attack targets the simulated service;
deploy at least one subsequent virtual security appliance simulating the targeted service to the location on the network corresponding to the physical location in response to the attack on the first virtual security appliance; and
alert a user of the targeted service in the physical location about the attack on the first virtual security appliance targeting the service, wherein the user is alerted about the attack based on the user being in the physical location of the attack and based on the user using the targeted service.

6. The system of claim 5, wherein the processing device is configured to receive data regarding at least one previous attack on at least one other virtual security appliance, and further configured to deploy the at least one subsequent virtual security appliance based on the data regarding the at least one previous attack on the at least one other virtual security appliance.

7. The system of claim 5, wherein the processing device is further configured to tailor at least one feature of the at least one subsequent virtual security appliance in response to the attack on the first virtual security appliance.

8. The system of claim 7, wherein tailoring the at least one feature is based on at least one of targeted ports, targeted services, user agent strings, specific vulnerabilities of the first virtual security appliance, and specific versions of services known to be vulnerable on the first virtual security appliance.

9. The system of claim 7, wherein the processing device is further configured to:
receive data regarding an attack on the at least one subsequent virtual security appliance; and
deploy an additional virtual security appliance to the location on the network corresponding to the physical location in response to the attack on the at least one subsequent virtual security appliance.

10. A method for monitoring network activity, the method comprising:
deploying a first virtual security appliance simulating a service to a first location on a network corresponding to a first physical location;
receiving data regarding an attack on the first virtual security appliance, wherein the attack targets the simulated service;
alerting a user of the targeted service in the first physical location about the attack on the first virtual security appliance targeting the service, wherein the user is alerted about the attack based on the user being in the first physical location of the attack and based on the user using the targeted service; and
redeploying the first virtual security appliance to a second location on the network corresponding to a second physical location based on the data regarding the attack on the first virtual security appliance.

11. The method of claim 10, further comprising tailoring at least one feature of the first virtual security appliance based on the data regarding the attack on-the first virtual security appliance, wherein tailoring the at least one feature is based on at least one of targeted ports, targeted services, user agent strings, specific vulnerabilities of the first virtual security appliance, and specific versions of services known to be vulnerable on the first virtual security appliance.

12. The method of claim 11, further comprising:
receiving data regarding a second attack on the tailored first virtual security appliance; and
tailoring at least one feature of the tailored first virtual security appliance in response to the second attack.

13. The method of claim 11, further comprising deploying at least one subsequent virtual security appliance to the second location on the network corresponding to the second physical location calculated to receive an attack.

* * * * *